April 21, 1970  KATASHI AOKI  3,507,012

MOLD CLOSING APPARATUS FOR AN INJECTION MOLDING MACHINE

Filed Sept. 21, 1967  3 Sheets-Sheet 1

INVENTOR
KATASHI AOKI
BY
Semmes & Semmes

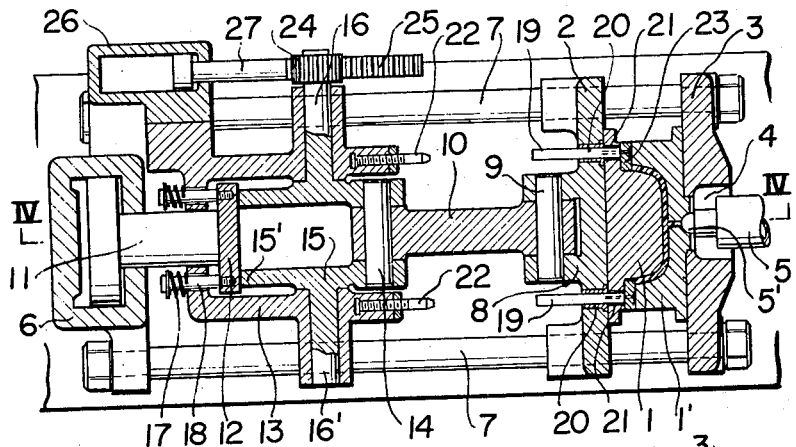
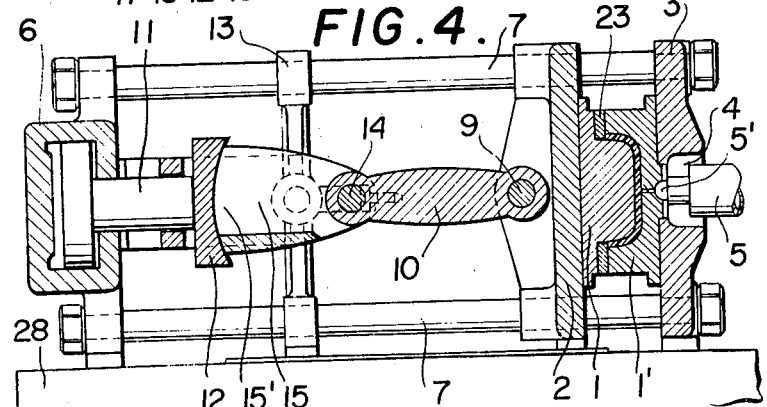
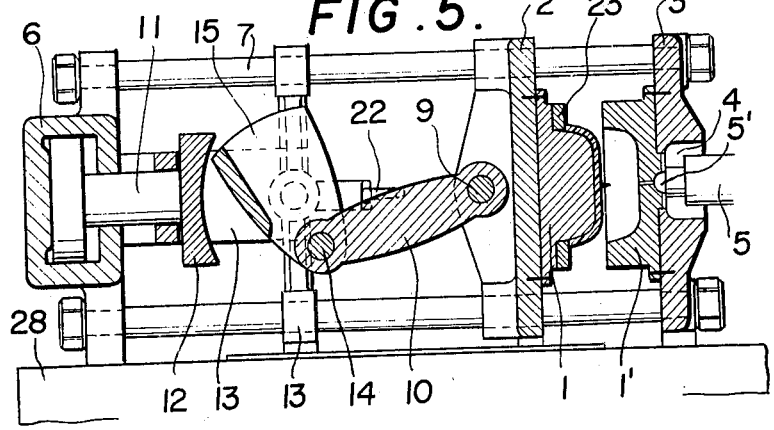

April 21, 1970  KATASHI AOKI  3,507,012
MOLD CLOSING APPARATUS FOR AN INJECTION MOLDING MACHINE
Filed Sept. 21, 1967  3 Sheets-Sheet 3

INVENTOR
KATASHI AOKI
BY
Semmes & Semmes

_United States Patent Office_

3,507,012
Patented Apr. 21, 1970

3,507,012
**MOLD CLOSING APPARATUS FOR AN
INJECTION MOLDING MACHINE**
Katashi Aoki, 6037 Oaza Nanjo, Hanishina-gun,
Sakaki-machi, Nagano-ken, Japan
Filed Sept. 21, 1967, Ser. No. 669,575
Int. Cl. B29f 1/00
U.S. Cl. 18—30                                    4 Claims

ABSTRACT OF THE DISCLOSURE

A mold closing and opening method of injection molding machine and apparatus thereof, which comprises driving a movable mold to or from a stationary mold by means of a rotation of a crank of a crank system for the greater part of the movement of the movable mold in prompt manner and thereafter, in a closing operation, pressing further the movable mold against the stationary mold by a hydraulic pressure means. Thus, the production cycle time is reduced as compared with an ordinary hydraulic pressure driven machine.

---

The present invention relates to the mold closing apparatus of an injection molding machine which is firm and rapid in operation. The closing or opening operation of the injection molding apparatus of the present invention is carried out by using a crank, whereas the movement of the mold of the molding machine is firm and rapid in the main operation step, and the movement at the final closing step are operated slowly. Thus the opening and closing operations of the mold portion of the injection molding machine can be carried out in a short time and without any shock, and the productivity of the machine is very much increased.

Further, the movable mold of the injection molding machine is driven to the front and rear directions against the stationary mold by a force of a crank motion, and at the final movement step in the nearest position to the stationary mold, the movable mold is pressed further on the rear portion thereof against the stationary mold by another pressing system.

And further, the injection molding machine of the present invention consists of a stationary mold which is connected to an injection machine; a movable mold which is facing against the stationary mold and is carried by a thrust plate; a crank system which is connected to the thrust plate by a connecting rod; a hydraulic system to drive the crank system; and other hydraulic system to press the movable mold through the crank system at the final operation step of the movable mold.

The various features and advantages of the present invention may be more fully understood from the drawings, which illustrate some embodiments of the invention, and the following descriptions thereof.

In the drawings:

FIG. 3 is a horizontal sectional view showing the closed position of the mold;

FIG. 4 is a vertical sectional view taken on the line IV—IV of FIG. 3;

FIG. 5 is a vertical sectional view of the embodiment showing a halfway position in the opening or closing movement of the movable mold;

Figure 1:
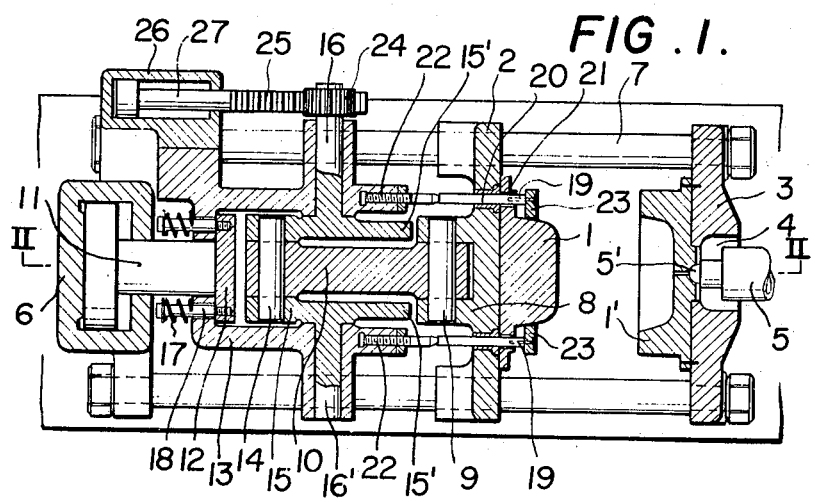
FIG. 1 is a horizontal sectional view of an embodiment of the present invention showing open position of the mold.
Figure 2:
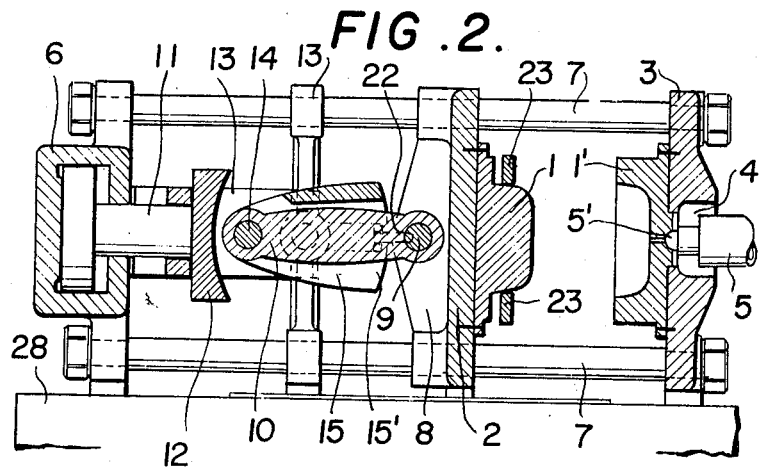
FIG. 2 is a vertical sectional view taken on the line II—II of FIG. 1.

Referring now to FIGS. 1 to 5, inclusive, 1 is a movable mold, 1' is a stationary mold, and 2 is a thrust plate to which said movable mold 1 is fixed. 3 is a head stock plate to which said stationary mold 1' is fixed and is settled on a bed 28. At the center of the stock plate 3, a bowl-shaped opening 4 is provided, through which a nozzle 5' of the injection machine 5 is inserted. The nozzle 5' reaches to the stationary mold 1'. A hydraulic cylinder 6 is provided at the opposite position of the head stock plate 1 on the bed 28 and it is connected to said plate 1 with tie rods 7. Said tie rods 7 are slidably inserted into the thrust plate 2, at the same time, the connecting portion 8 on the back side of the thrust plate 2 is connected with a connecting rod 10 by a connecting pin 9. At the top of the hydraulic piston rod 11 of the hydraulic cylinder 6, a pressure plate 12 is provided. The other end portion of the above-mentioned connecting rod 10 is rotatably joined with the crank 15 by a pin 14, and crank axles 16 and 16' of the crank 15 are rotatably inserted into the crank carrier 13 which is holding said pressure plate 12. In this case, one side portion of the crank 15 is formed open end portions 15'.

The pressure plate 12 is provided with fitting pins 18 with screw threads, and coil springs 17 are provided between the crank carrier 13 and around the fitting pins 18, in order to fit the pressure plate 12 to the crank carrier 15. Thus the pressure plate 12 is pushed to the open end 15' of the crank moderately against the spring 17 force when the piston rod 11 goes forward and a strong power is supplied to the movable mold 1 through the crank system.

The thrust plate 2 and movable mold 1 are provided with holes 20 and 21, respectively, to insert knock out pins 19, and the top portion of the crank carrier 15 is provided with screw threaded adjusting pins 22 in order to push out and adjust the knock out pins 19. In an opening step, the adjusting pins 22 push out the knock out pins 19 and further push out an ejector plate 23 which is fitted to the movable mold 1, thus the molded article is automatically separated from the movable mold 1. The ejecting position of the molded article can be controled by the adjusting pins 22 which move backwards and forwards by means of the screw threads.

The crank axle 16 between the aforementioned crank axles 16 and 16' is elongated outside through the crank carrier 13, and a pinion gear 24 is provided at the top portion of the crank axle 16. A rack 25 being engaged with the pinion 24 is provided on the top portion of a piston rod 27 of a hydraulic cylinder 26 which is fixed to the crank carrier 13. The main mold closing operation is carried out by driving the hydraulic cylinder 26, rotating the pinion 24 by means of the rack 25, rotating the crank axles 16 and 16' in the amount of an angle 180°, rotating the crank 15 as shown in FIGS. from 2 through 5 to 4 and pushing forward the thrust plate 2 and the movable mold 1 against the stationary mold 1'.

And then the final mold closing operation follows the above-mentioned crank rotation, that is, driving the hydraulic cylinder 6, pushing forward the pressure plate 12 by the hydraulic piston rod 11, bringing the pressure plate 12 into contact with the open ends 15' of the crank body 15, and pressing firmly the movable mold 1 against the stationary mold 1' as shown in FIGS. 3 and 4.

Next at the mold opening operation, in the first step, the piston rod 11 of the hydraulic cylinder 6 is retracted to return and release the pressure plate 12 from the open ends 15' of the crank 15 by the spring action of the coil spring 17, and then, the crank 15 is rotated backward in the amount of an angle 180° by means of the hydraulic cylinder 26, thus the movable mold 1 is retracted rapidly from the stationary mold 1'. Nearly at the end of this step, the molded article is pushed off from the movable mold 1 by the ejector plate 23 which is pushed by the knock out pins 19. Thus, a cycle injection molding operation is carried out.

In accordance with the present invention, injection molding operation is carried out firmly and promptly without any difficulties or troubles as compared with the ordinary apparatus, because the movable mold is driven rapidly by the 180° crank rotation in the main movement and further supplied with a hydraulic force movement in the final step of the movement.

Figure 6:
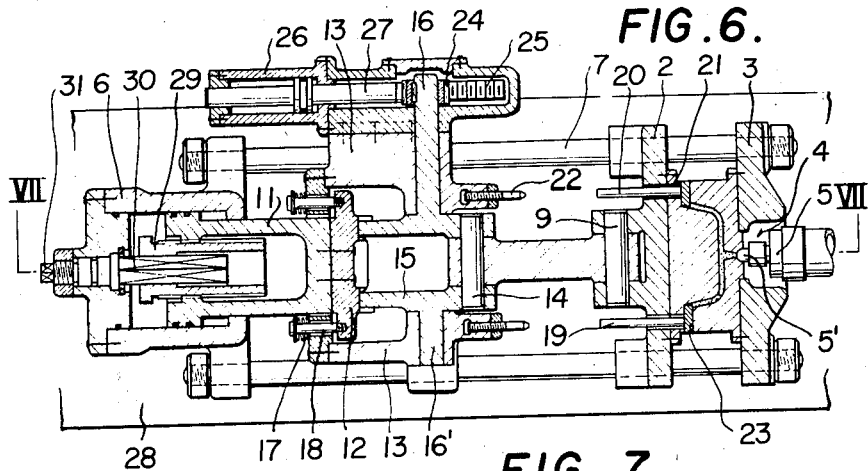
FIG. 6 is a horizontal sectional view of another embodiment of the present invention showing closed position of the movable mold, which is provided with a stroke adjusting device of a hydraulic piston rod.
Figure 7:
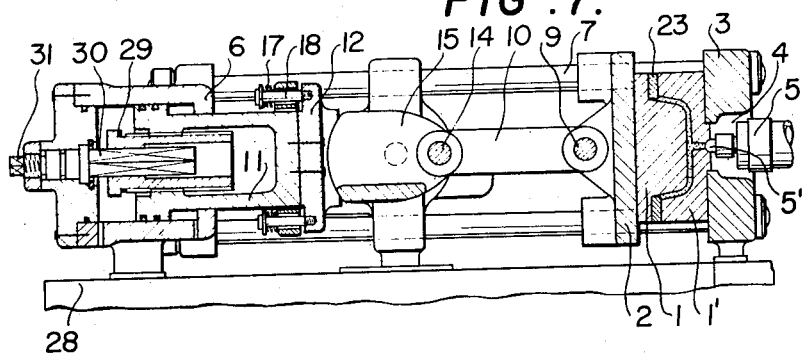
FIG. 7 is a vertical sectional view taken on the line VII—VII of FIG. 6.

The second embodiment of the present invention is shown in FIGS. 6 and 7, which is provided with a stroke adjusting device of the hydraulic piston rod 11. In the apparatus shown in the first embodiment, if the thicknesses of the halves of the molds 1 and 1' are varied, it will be noted that the position of the end portion 15' of the crank 15 changes. Therefore, in the second embodiment, the terminal position of the retraction of the hydraulic piston rod 11 is made adjustable so as to employ variously sized molds. Otherwise, the hydraulic piston rod 11 may be moved fully backward in the retraction step and the excess retraction of the hydraulic piston rod 11 takes much time.

In FIGS. 6 and 7, the main crank action of the apparatus is the same as that of the first embodiment, and each corresponding part of the apparatus is indicated with the same numeral as shown in FIGS. 1 to 4 inclusive.

The hydraulic piston rod 11 is provided with an adjusting screw 29 which engages into the inside of the rod 11 with screw threads. The pivotal center of the adjusting screw 29 is slidably provided with a square axle 30 which is coupled with an outer adjusting axle 31. Said adjusting screw 29 can be rotated by the outer adjusting axle 31 from the outside of the hydraulic cylinder 6 through the square axle 30 in order to adjust the retraction terminal of the hydraulic piston rod 11.

The terminal position of the hydraulic piston rod 11 is to be set so as to leave a small space between the movable mold 1 and the stationary mold 1' when the crank 15 is at the mold closing position, and thereafter, the both halves of the molds 1 and 1' may be pressed together by a relatively short advancement of the hydraulic piston rod 11 through the pressure plate 12, the crank 15, the connecting rod 10, and the thrust plate 2.

Figure 8:
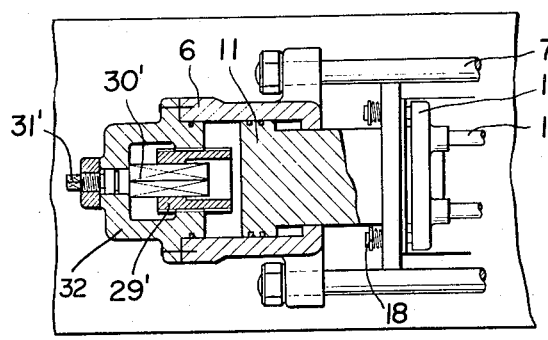
FIG. 8 is a partial sectional plan view of the another type of the stroke adjusting device.

Another variation of the stroke adjusting device of the hydraulic piston rod 11 is shown in FIG. 8. In this case, the cylinder 6 is provided with a cylinder cap 32 to hold an adjusting screw 29' in the inside thereof by means of screw threads. And a square axle 30' and an outer adjusting axle 31' are provided in the same manner as those in the aforementioned second embodiment. As explained in the aforementioned second embodiment, the stroke of the piston rod 11 can be varied by means of the adjusting axle 31' through the square axle 30' and the adjusting screw 29'.

Employing these stroke adjusting devices of the hydraulic piston rod 11, variously sized molds are available for the injection molding machine of the present invention which is driven by a crank action.

It will be seen that the apparatus described herein are serviceable to any injection molds, and rapid and durable in operation. It should be emphasized, however, that the specific embodiments described and shown herein are intended as merely illustrative and in no way restrictive of the invention.

What is claimed is:
1. An injection molding apparatus which comprises:
 (A) an injector device;
 (B) a stationary mold on a head stock plate being provided with a material supplying nozzle of said injector device;
 (C) a movable mold on a thrust plate being faced with said stationary mold;
 (D) a crank system being connected with said thrust plate by connecting rod and including:
  (i) a rotatable crank body being provided with crank axles on the both sides of said crank body,
  (ii) a crank carrier which receives said crank axles, and
  (iii) a connecting rod being connected between said crank body and the thrust plate by connecting pins, one crank axle of said crank axles being engaged with the first hydraulic pressure means through a pinion gear and a rack gear in order to rotate said crank body and to advance the movable mold on said thrust plate.
 (E) a first hydraulic pressure means to rotate a crank of said crank system; and
 (F) another second hydraulic pressure means to press said movable mold through said crank system when said crank system being in mold closing position.
2. An injection molding apparatus as in claim 1, wherein said rotatable crank body has open end portions extending axially thereof.
3. An injection molding apparatus claimed in claim 1, in which the second hydraulic pressure means is provided with a stroke adjusting device to avoid an unnecessary deep retraction of a piston rod of said hydraulic pressure means.
4. An injection molding apparatus claimed in claim 3, in which the stroke adjusting device comprises an adjusting screw to set a terminal position of the piston rod of the second hydraulic pressure means, a square axle to rotate said adjusting screw which being engaged into said adjusting screw, and an outer adjusting axle which being rotatably connected with said square axle and capable of being rotated at the outside of said hydraulic means.

References Cited

UNITED STATES PATENTS 2,618,823   11/1952   Perkon.

FOREIGN PATENTS 1,170,929   9/1958   France.
1,364,693   5/1964   France.
1,127,069   4/1962   Germany.
888,184   1/1962   Great Britain.
912,866   12/1962   Great Britain.

J. SPENCER OVERHOLSER, Primary Examiner

M. O. SUTTON, Assistant Examiner

U.S. Cl. X.R.

164—341